United States Patent
Hazama

(10) Patent No.: US 10,150,038 B2
(45) Date of Patent: Dec. 11, 2018

(54) COMPUTER-READABLE RECORDING MEDIUM, COMPUTER APPARATUS, GAME PROCESSING METHOD, AND SYSTEM

(71) Applicant: SQUARE ENIX CO., LTD., Tokyo (JP)

(72) Inventor: Ichiro Hazama, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 15/437,627

(22) Filed: Feb. 21, 2017

(65) Prior Publication Data
US 2017/0239571 A1 Aug. 24, 2017

(30) Foreign Application Priority Data
Feb. 22, 2016 (JP) .................... 2016-031465

(51) Int. Cl.
*G06F 17/00* (2006.01)
*A63F 13/53* (2014.01)
*A63F 13/35* (2014.01)
*A63F 13/49* (2014.01)

(52) U.S. Cl.
CPC .............. *A63F 13/53* (2014.09); *A63F 13/35* (2014.09); *A63F 13/49* (2014.09)

(58) Field of Classification Search
None
See application file for complete search history.

(56) References Cited

U.S. PATENT DOCUMENTS

| 8,784,170 | B1 * | 7/2014 | Murakami | A63F 13/00 463/25 |
| 8,956,227 | B2 * | 2/2015 | Suzuki | A63F 13/10 463/30 |
| 9,656,170 | B2 * | 5/2017 | Ando | A63F 13/10 |

(Continued)

FOREIGN PATENT DOCUMENTS

JP 2011-130779 7/2011

OTHER PUBLICATIONS

Office Action from Japan Patent Office (JPO) in Japanese Patent Appl. No. 2016-031465, dated Feb. 7, 2017, together with a partial English language translation.

(Continued)

*Primary Examiner* — Ronald Laneau
(74) *Attorney, Agent, or Firm* — Greenblum & Bernstein, P.L.C.

(57) ABSTRACT

A game program causes a computer apparatus to function as: a specifier that specifies an object placed in a field according to a player's operation instruction; an event generator that generates, in a case where a predetermined object corresponding to a predetermined event is specified, the predetermined event; a displayer that changes a display mode of a specified object or a field corresponding to the specified object according to a positional relationship between a position of the specified object and a position of the predetermined object for display; an effect generation enabler that makes a predetermined effect in a game generable according to a history of a game until the predetermined object is specified or a progressing situation of the game; and an effect generator that generates a generable effect.

17 Claims, 16 Drawing Sheets

(56) References Cited

U.S. PATENT DOCUMENTS

2012/0238357 A1     9/2012   Yamamoto et al.
2013/0109472 A1*   5/2013   Tabata ................... A63F 13/10
                                                                                                       463/31

OTHER PUBLICATIONS

Hideto Tarui, "'Minesweeper' tailored to an adventure game [Microsoft Treasure Hunt]", Mado no Mori [online], pp. 1-3 (Dec. 11, 2014) available at URL http://forest.watch.impress.co.jp/docs/review/679818.html, together with a partial English language translation.
Loxee, "Tohojiraigen", [online], pp. 1-10 (Mar. 22, 2011) available at URL http://loxee.web.fc2.com/thjirai.html, together with a partial English language translation.
Office Action from Japan Patent Office (JPO) in Japanese Patent Appl. No. 2016-031465, dated Nov. 28, 2017, together with a partial English language translation.

\* cited by examiner

FIG. 8

ADDED POINT MASTER TABLE

| CONDITION ID (201) | CONTENT (202) | ADDED POINTS (203) |
|---|---|---|
| J001 | THE NUMBER OF TIMES OF EVENT GENERATION IS SMALLER THAN 5 FROM THE BEGINNING OF PLAY | 5 |
| J002 | WITHIN 30 SECONDS UNTIL END TIME | 15 |
| J003 | DURING COMBAT WITH ENEMY CHARACTER | 35 |
| J004 | COMBOS OF N TAPS BEING GENERATED | $2n$ |
| J005 | POINT-UP SKILL EFFECT BEING GENERATED | 10 |
| J006 | POINT-UP ITEM EFFECT BEING GENERATED | 17 |
| ... | ... | ... |

200

EVENT CORRESPONDENCE MASTER TABLE

| ORDINATE | ABSCISSA | EVENT |
|---|---|---|
| 1 | 2 | DAMAGED AT POISONOUS POND |
| 2 | 3 | ITEM ACQUIREMENT |
| 3 | 4 | DAMAGED AT POISONOUS POND |
| 4 | 4 | ITEM ACQUIREMENT |
| 5 | 4 | ITEM ACQUIREMENT |
| 6 | 4 | ENEMY ENCOUNTER |
| ... | ... | ... |

220

COMPUTER-READABLE RECORDING MEDIUM, COMPUTER APPARATUS, GAME PROCESSING METHOD, AND SYSTEM

CROSS REFERENCE TO RELATED APPLICATION

The present disclosure relates to subject matter contained in Japanese Patent Application No. 2016-031465, filed on Feb. 23, 2016, the disclosure of which is expressly incorporated herein by reference in its entirety.

BACKGROUND OF THE INVENTION

Field of the Invention

The present invention relates to a computer-readable recording medium, a computer apparatus, a game processing method, and a system.

Description of Related Art

In the related art, a game in which a player processes the game while predicting danger in order to avoid dangerous elements which are obstacles in game processing is known. For example, there is a game in which if a specific panel is opened, a bomb explodes, and then, the game ends. In such a game, in order to predict a position of a bomb, information which is a hint for informing the position of the bomb is provided to the player, and the player processes the game based on the information.

SUMMARY OF THE INVENTION

Technical Problem

In the above-mentioned game, if the position of the bomb can be predicted, the game can be easily completed, and thus, the number of bombs is increased by enlarging a game field, or a time limit is set. However, rules of the game are monotonous and strategic characteristics are lacking, and thus, it is difficult to provide an interesting game to a player.

An object of at least one embodiment of the invention is to provide a computer-readable recording medium, a computer apparatus, a game processing method, and a system capable of providing a strategic and interesting game.

Solution to Problem

According to a non-limiting aspect, a non-transitory computer-readable recording medium having recorded thereon a game program which is executed in a computer apparatus that causes the computer apparatus to function as: a specifier that specifies an object placed in a field according to a player's operation instruction; an event generator that generates, in a case where a predetermined object corresponding to a predetermined event is specified by the specifier, the predetermined event; a displayer that changes, in a case where an object is specified by the specifier, a display mode of the specified object or a field corresponding to the specified object according to a positional relationship between a position of the specified object and a position of the predetermined object for display; an effect generation enabler that makes a predetermined effect in a game generable according to a history of a game until the predetermined object is specified or a progressing situation of the game when the predetermined object is specified; and an effect generator that generates an effect that is made generable by the effect generation enabler.

According to a non-limiting aspect, a computer apparatus comprising: a specifier that specifies an object placed in a field according to a player's operation instruction; an event generator that generates, in a case where a predetermined object corresponding to a predetermined event is specified by the specifier, the predetermined event; a displayer that changes, in a case where an object is specified by the specifier, a display mode of the specified object or a field corresponding to the specified object according to a positional relationship between a position of the specified object and a position of the predetermined object for display; an effect generation enabler that makes a predetermined effect in a game generable according to a history of a game until the predetermined object is specified or a progressing situation of the game when the predetermined object is specified; and an effect generator that generates an effect that is made generable by the effect generation enabler.

According to a non-limiting aspect, a game processing method executed in a computer apparatus, comprising: a step of specifying an object placed in a field according to a player's operation instruction; a step of generating, in a case where a predetermined object corresponding to a predetermined event is specified, the predetermined event; a step of changing, in a case where an object is specified, a display mode of the specified object or a field corresponding to the specified object according to a positional relationship between a position of the specified object and a position of the predetermined object for display; a step of making a predetermined effect in a game generable according to a history of a game until the predetermined object is specified or a progressing situation of the game when the predetermined object is specified; and a step of generating a generable effect.

According to a non-limiting aspect, a non-transitory computer-readable recording medium having recorded thereon a game program which executed in a server apparatus which is connectable to a computer apparatus through communication, causing the server apparatus to function as: an information receiver that receives information relating to a player's operation instruction from the computer apparatus; a specifier that specifies an object placed in a field according to the received information; an event generator that generates, in a case where a predetermined object corresponding to a predetermined event is specified by the specifier, the predetermined event; a changer that changes, in a case where an object is specified by the specifier, a display mode of the specified object or a field corresponding to the specified object according to a positional relationship between a position of the specified object and a position of the predetermined object; an effect generation enabler that makes a predetermined effect in a game generable according to a history of a game until the predetermined object is specified or a progressing situation of the game when the predetermined object is specified; an effect generator that generates an effect that is made generable by the effect generation enabler; and a calculation result transmitter that transmits information relating to a calculation result to the computer apparatus.

According to a non-limiting aspect, a system that includes a computer apparatus and a server apparatus that is connectable to the computer apparatus through communication, comprising: a specifier that specifies an object placed in a field according to a player's operation instruction; an event generator that generates, in a case where a predetermined object corresponding to a predetermined event is specified by the specifier, the predetermined event; a displayer that changes, in a case where an object is specified by the specifier, a display mode of the specified object or a field corresponding to the specified object according to a positional relationship between a position of the specified object and a position of the predetermined object for display; an effect generation enabler that makes a predetermined effect in a game generable according to a history of a game until the predetermined object is specified or a progressing situation of the game when the predetermined object is specified; and an effect generator that generates an effect that is made generable by the effect generation enabler.

According to a non-limiting aspect, a non-transitory computer-readable recording medium having recorded thereon a game program which executed in a computer apparatus that is connectable to a server apparatus through communication, wherein the server apparatus receives information relating to a player's operation instruction from the computer apparatus; specifies an object placed in a field according to the received information; generates, in a case where a predetermined object corresponding to a predetermined event is specified, the predetermined event; changes, in a case where an object is specified, a display mode of the specified object or a field corresponding to the specified object according to a positional relationship between a position of the specified object and a position of the predetermined object; makes a predetermined effect in a game generable according to a history of a game until the predetermined object is specified or a progressing situation of the game when the predetermined object is specified; generates a generable effect; and transmits information relating to a calculation result to the computer apparatus, and wherein the game program causes the computer apparatus to function as: an information transmitter that transmits information relating to the player's operation instruction to the server apparatus, a calculation result receiver that receives the information relating to the calculation result from the server apparatus, and an information displayer that displays the received information relating to the calculation result on a display device.

According to a non-limiting aspect, a game processing method executed in a server apparatus that is connectable to a computer apparatus through communication, comprising: a step of receiving information relating to a player's operation instruction from the computer apparatus; a step of specifying an object placed in a field according to the received information; a step of generating, in a case where a predetermined object corresponding to a predetermined event is specified, the predetermined event; a step of changing, in a case where an object is specified, a display mode of the specified object or a field corresponding to the specified object according to a positional relationship between a position of the specified object and a position of the predetermined object; a step of making a predetermined effect in a game generable according to a history of a game until the predetermined object is specified or a progressing situation of the game when the predetermined object is specified; a step of generating a generable effect; and a step of transmitting information relating to a calculation result to the computer apparatus.

According to a non-limiting aspect, a game processing method executed in a system that includes a computer apparatus and a server apparatus that is connectable to the computer apparatus through communication, comprising: a step of specifying an object placed in a field according to a player's operation instruction; a step of generating, in a case where a predetermined object corresponding to a predetermined event is specified, the predetermined event; a step of changing, in a case where an object is specified, a display mode of the specified object or a field corresponding to the specified object according to a positional relationship between a position of the specified object and a position of the predetermined object for display; a step of making a predetermined effect in a game generable according to a history of a game until the predetermined object is specified or a progressing situation of the game when the predetermined object is specified; and a step of generating a generable effect.

Advantageous Effects of Invention

One or more of the above problems can be solved with each embodiment of the present invention.

BRIEF DESCRIPTION OF THE DRAWINGS

FIG. 8 is a diagram showing an added point master table corresponding to at least one of embodiments of the invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
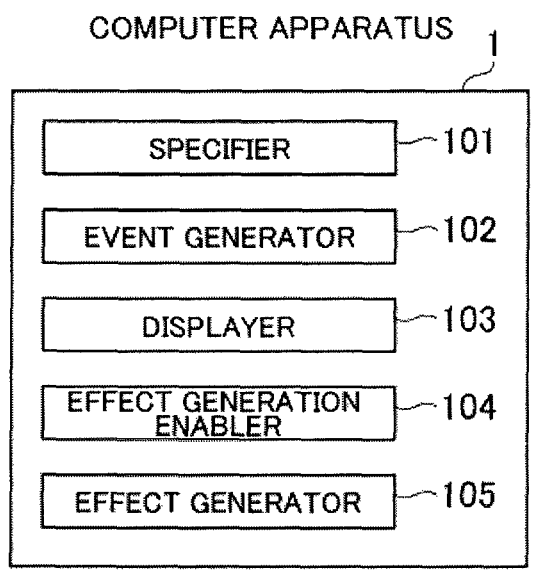
FIG. 1 is a block diagram illustrating a configuration of a computer apparatus corresponding to at least one of embodiments of the invention.

Hereinafter, an outline of a first embodiment of the invention will be described. FIG. 1 is a block diagram illustrating a configuration of a computer apparatus corresponding to at least one of embodiments of the invention. A computer apparatus 1 includes at least a specifier 101, an event generator 102, a displayer 103, an effect generation enabler 104, and an effect generator 105.

The specifier 101 has a function of specifying an object placed in a field according to a player's operation instruction. The event generator 102 has a function of generating a predetermined event in a case where a predetermined object corresponding to a predetermined event is specified by the specifier 101.

The displayer 103 has a function of changing, in a case where an object is specified by the specifier 101, a display mode of the specified object or a field corresponding to the specified object according to a positional relationship between a position of the specified object and a position of the predetermined object for display.

The effect generation enabler 104 has a function of making a predetermined effect in a game generable according to a history of a game until a predetermined object is specified or a progressing situation of the game when the predetermined object is specified. The effect generator 105 has a function of generating an effect that is made generable by the effect generation enabler.

Figure 2:
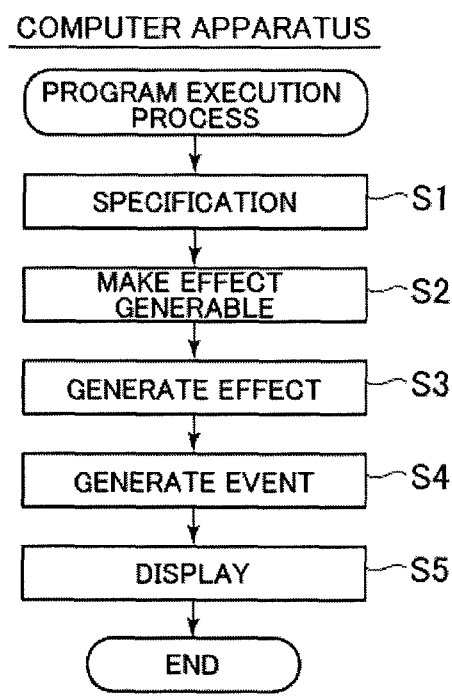
FIG. 2 is a flowchart of a program execution process corresponding to at least one of embodiments of the invention.

A program execution process in the first embodiment of the invention will be described. FIG. 2 is a flowchart of a program execution process corresponding to at least one of embodiments of the invention.

The computer apparatus 1 receives specification of an object placed in a field according to a player's operation instruction (step S1). The computer apparatus 1 makes a predetermined effect in a game generable according to a history of the game until a predetermined object is specified or a progressing situation of the game when the predetermined object is specified (step S2). Further, the computer apparatus 1 generates the generable effect (step S3).

Then, the computer apparatus 1 generates, in a case where a predetermined object associated with a predetermined event is specified in step S1, the predetermined event (step S4).

In a case where an object is specified in step S1, the computer apparatus 1 changes a display mode of the specified object or a field corresponding to the specified object according to a positional relationship between a position of the specified object and a position of the predetermined object for display (step S5), and then, terminates the procedure.

According to an aspect of the first embodiment, by making a predetermined effect in a game generable according to a history of the game until a predetermined object is specified or a progressing situation of the game when the predetermined object is specified, it is possible to provide a strategic and interesting game.

In the first embodiment, the "computer apparatus" refers to a desk-top computer or a notebook type personal computer, a tablet computer, a PDA, or the like, for example, and may be a mobile terminal of which a display screen includes a touch panel sensor. The "game" refers to a computer game of which a program is started and executed in a computer apparatus, for example, and may include any genre of game content.

The "operation instruction" refers to an instruction of an operation with respect to an apparatus mountable to a computer apparatus, for example. The "field" refers to a game space, for example, and refers to a place where an object is placed.

The "object" is not particularly limited as long as it can be specified according to a player's operation instruction, for example. The object may include a panel or the like, as well as a character or an item. The "event" refers to an event generated in a game, for example, and may include acquisition of an item, a combat with an enemy character, or the like.

The "display mode of the field" means a mode capable of being visually recognized through a pattern, a color, a texture, or the like of a field, for example. The "positional relationship between the position of the specified object and the position of the predetermined object" refers a relationship between positions of the specified object and the predetermined object, and is a concept including various cases such as a case where objects are adjacent to each other, a case where objects are present in the vicinity, a case where objects intersect each other, a case where objects overlaps each other, or a case where objects are present at skew positions, for example. The "change" refers to change in any one of a pattern, a color, a texture, or the like of an object or a field, for example.

The "history of the game" refers to data obtained during processing of the game, for example, and is a concept including a game play time or the number of operation instructions with respect to a specific character. The "game processing situation" is a concept including which stage in an entire game is being processed or whether a player satisfies a predetermined condition, for example.

The "effect" refers to an advantageous or disadvantageous action with respect to a player in a game, for example, and is a concept including increase or decrease in an effect obtained when the player gives an operation instruction for using an item or a magic to a player character, or change in a striking power of a player character or an enemy character in a combat with the enemy character.

Second Embodiment

Figure 3:
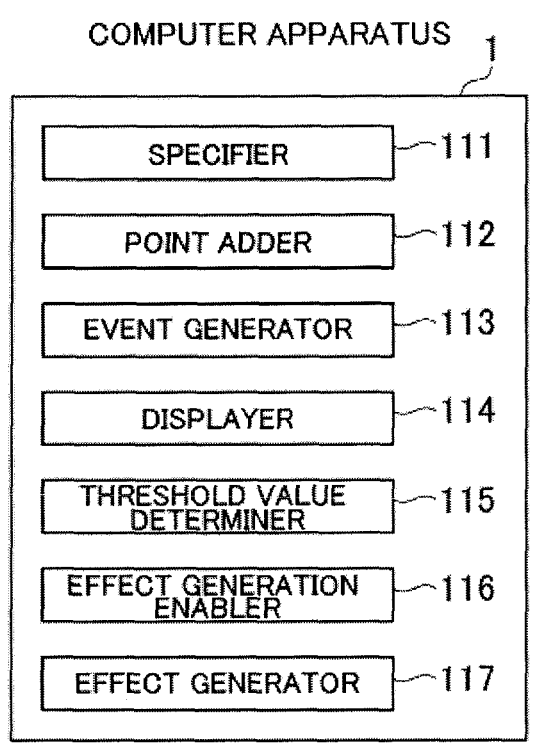
FIG. 3 is a block diagram illustrating a configuration of a computer apparatus corresponding to at least one of embodiments of the invention.

Next, an outline of a second embodiment of the invention will be described. FIG. 3 is a block diagram illustrating a configuration of a computer apparatus corresponding to at least one of embodiments of the invention. A computer apparatus 1 includes at least a specifier 111, a point adder 112, an event generator 113, a displayer 114, a threshold value determiner 115, an effect generation enabler 116, and an effect generator 117.

The specifier 111 has a function of specifying an object placed in a field according to a player's operation instruction. The point adder 112 has a function of performing addition of points when an object is specified by the specifier 111 and storing the points in a storage area. The event generator 113 has a function of generating, in a case where a predetermined object associated with a predetermined event is specified by the specifier 111, the predetermined event.

The displayer 114 has a function of changing, in a case where an object is specified by the specifier 111, a display mode of the specified object or a field corresponding to the specified object according to a positional relationship between a position of the specified object and a position of the predetermined object for display.

The threshold value determiner 115 has a function of determining whether points stored in the storage area are equal to or greater than a predetermined threshold value. The effect generation enabler 116 has a function of making, in a case where the threshold value determiner 115 determines that the points are equal to or greater than the predetermined threshold value, a predetermined effect in a game generable according to a history of a game until a predetermined object is specified or a progressing situation of the game when the predetermined object is specified. The effect generator 117 has a function of generating an effect that is made generable by the effect generation enabler.

Figure 4:
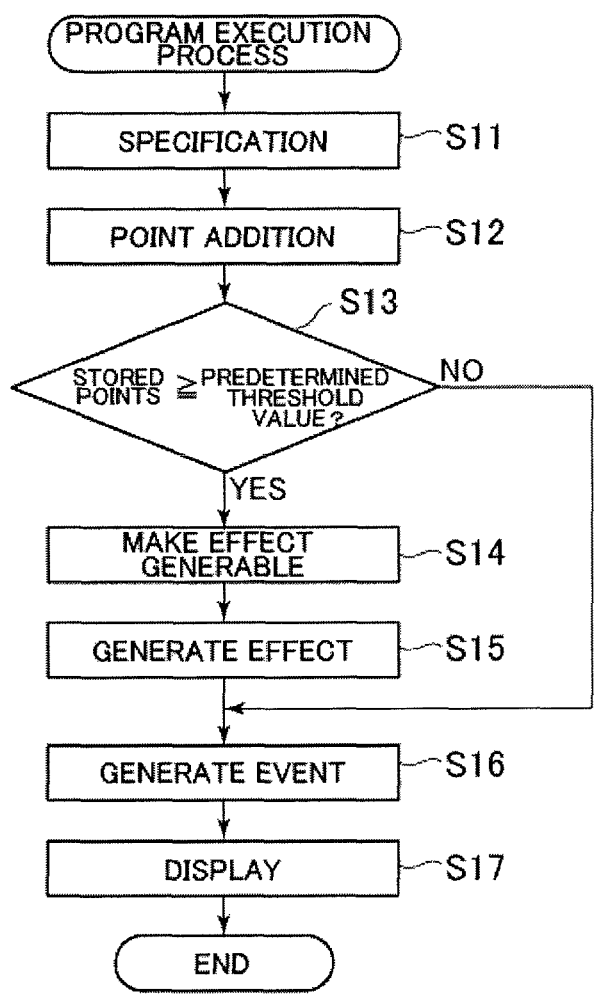
FIG. 4 is a flowchart of a program execution process corresponding to at least one of embodiments of the invention.

A program execution process according to the second embodiment of the invention will be described. FIG. 4 is a flowchart of a program execution process corresponding to at least one of embodiments of the invention.

The computer apparatus 1 receives specification of an object placed in a field according to a player's operation instruction (step S11). Then, if the object is specified, the computer apparatus 1 performs addition of points for storage (step S12).

Then, it is determined whether the stored points are equal to or greater than a predetermined threshold value (step S13). In a case where the stored points are equal to or greater than the predetermined threshold value (YES in step S13), the computer apparatus 1 makes a predetermined effect in a game generable according to a history of a game until a predetermined object is specified or a progressing situation of the game when the predetermined object is specified (step S14). Then, the computer apparatus 1 generates the generable effect (step S15). On the other hand, in a case where the points are smaller than the threshold value (NO in step S13), the procedure proceeds to the next step without making a predetermined effect generable.

Further, the computer apparatus 1 generates, in a case where a predetermined object associated with a predetermined event is specified in step S11, the predetermined event (step S16).

In a case where an object is specified in step S11, the computer apparatus 1 changes a display mode of the specified object or a field corresponding to the specified object according to a positional relationship between a position of the specified object and a position of the predetermined object for display (step S17), and then, terminates the procedure.

According to an aspect of the second embodiment, since a predetermined effect is generated by making an effect generable only in a case where points to be added when an object is specified exceed a predetermined threshold value, it is possible to give a player a strong motivation to specify a large number of objects, and thus, it is possible to provide a more strategic and interesting game.

In the second embodiment, the "computer apparatus", the "game", the "operation instruction", the "field", the "object", the "event", the "field display mode", the "positional relationship between positions of objects", the "history of the game", the "game progressing situation", and the "effect" are the same as the contents disclosed in the first embodiment, respectively.

Third Embodiment

Next, an outline of a third embodiment of the invention will be described. A configuration of a computer apparatus according to the third embodiment may employ the same configuration as that shown in the block diagram of FIG. 1. Further, a flow of a program execution process in the third embodiment may employ the same configuration as that shown in the flowchart of FIG. 2.

In the third embodiment, an effect to be generated refers to a predetermined effect to be generated with respect to a predetermined event generated by an event generator.

According to an aspect of the third embodiment, since objects are specified, by generating a predetermined effect with respect to an event corresponding to an object specified by a player, while considering whether to generate the event after entering a state where the predetermined effect is generable or to generate the event before entering the state where the predetermined effect is generable, it is possible to provide a strategic and interesting game.

In the third embodiment, the "computer apparatus", the "game", the "operation instruction", the "field", the "object", the "event", the "field display mode", the "positional relationship between positions of objects", the "history of the game", the "game progressing situation", and the "effect" are the same as the contents disclosed in the first embodiment, respectively.

Fourth Embodiment

Figure 5:
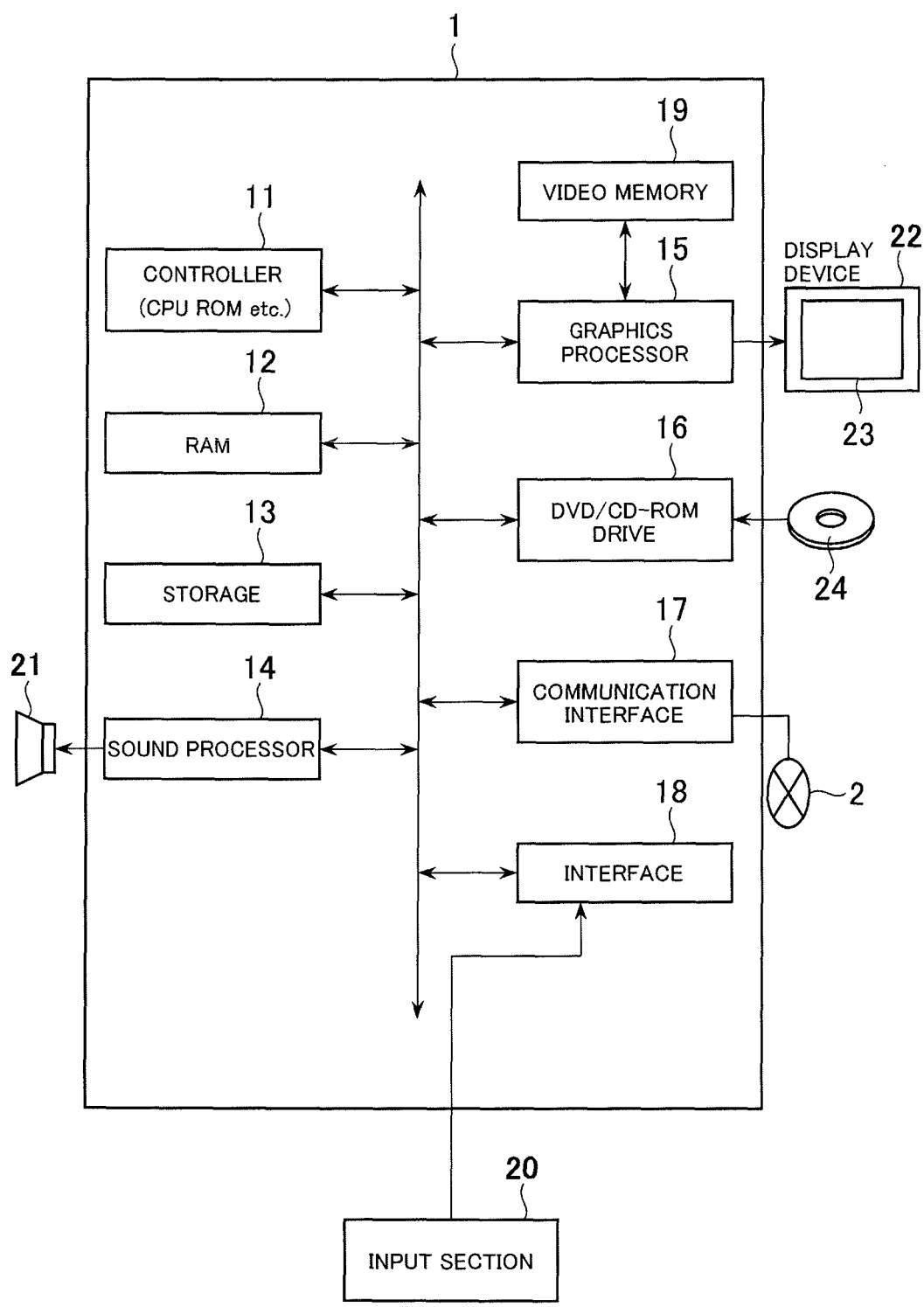
FIG. 5 is a block diagram showing a configuration of a computer apparatus corresponding to at least one of embodiments of the invention.

Next, an outline of a fourth embodiment of the invention will be described. FIG. 5 is a block diagram showing a configuration of a computer apparatus corresponding to at least one of embodiments of the invention. A computer apparatus 1 includes at least a controller 11, a RAM (random access memory) 12, a storage 13, a sound processor 14, a graphics processor 15, a DVD/CD-ROM drive 16, a communication interface 17, and an interface 18, which are connected to each other through an internal bus.

The controller 11 includes a central processing unit (CPU) and a ROM (read only memory). The controller 11 executes a program stored in the storage 13 or a recording medium 24 to control the computer apparatus 1. Further, the controller 11 includes an internal timer that clocks time. The RAM 12 is a work area of the controller 11. The storage 13 is a storage area for storing a program or data.

The DVD/CD-ROM drive 16 is a unit on which the recording medium 24 on which a program is stored, such as a DVD-ROM or a CD-ROM, can be mounted. For example, a program and data are stored on the recording medium 24. The program and data are read from the recording medium 24 by the DVD/CD-ROM drive 16, and are loaded into the RAM 12.

The controller 11 reads the program and data from the RAM 12 and performs a process. The controller 11 processes the program and data loaded in the RAM 12 to output a sound output instruction to the sound processor 14, and to output a drawing command to the graphics processor 15.

The sound processor 14 is connected to a sound output device 21 which is a speaker. If the controller 11 outputs a sound output instruction to the sound processor 14, the sound processor 14 outputs a sound signal to the sound output device 21.

The graphics processor 15 is connected to a display device 22. The display device 22 includes a display screen 23. If the controller 11 outputs a drawing command to the graphics processor 15, the graphics processor 15 develops an image into a video memory (frame buffer) 19, and outputs a video signal for displaying the image on the display screen 23. The graphics processor 15 executes drawing for one image in the unit of frames. One frame time of the image is 1/30 seconds, for example. The graphics processor 15 has a function of receiving a part of a calculation process relating to the drawing performed only by the controller 11 to disperse a load of an entire system.

The input section 20 (for example, a mouse, a keyboard, or the like) may be connected to the interface 18. Information input through the input section 20 from a user is stored in the RAM 12, and the controller 11 executes a variety of calculation processes based on the input information. Alternatively, a configuration in which a storage medium reading device is connected to the interface 18, and a program, data or the like is read from a memory or the like may be used. Further, the display device 22 that includes a touch panel may be used as the input section 20.

The communication interface 17 may be connected to a communication network 2 in a wireless or wired manner, and may perform transmission and reception of information with other computer apparatuses through the communication network 2.

Figure 6:
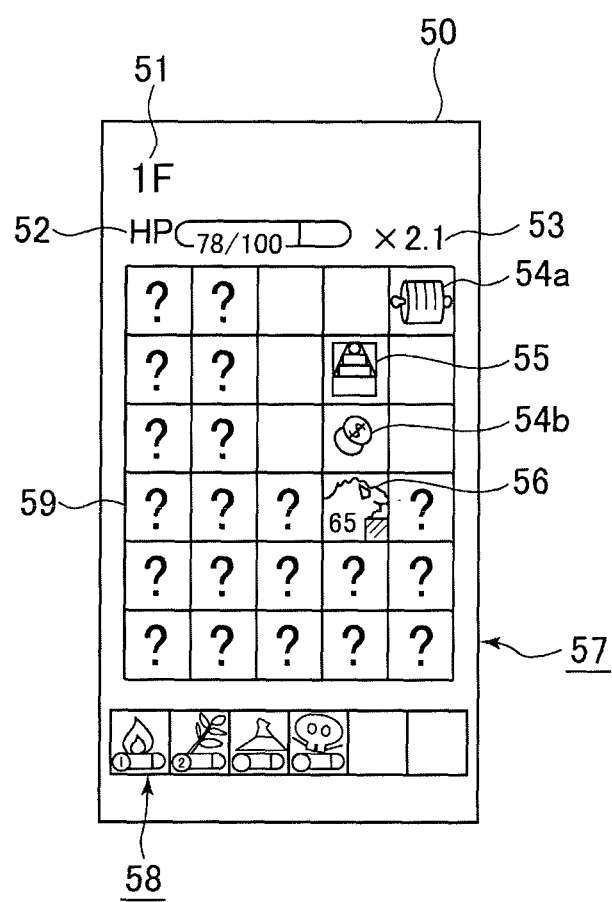
FIG. 6 is a flowchart of a program execution process corresponding to at least one of embodiments of the invention.

Next, a program execution process in the fourth embodiment of the invention will be described. FIG. 6 is a flowchart of a program execution process corresponding to at least one of embodiments of the invention. In the fourth embodiment, a game in which a player character operated by a player searches for a dungeon is shown as an embodiment.

An execution screen 50 is displayed on the display screen 23 of the computer apparatus 1. A floor 51 indicating a current floor of a dungeon, a physical power value 52 of a player character, points 53 for generating an effect, an item 54 obtained by an event during a game, a stairway 55 for proceeding to the next stage generated by the event during the game, an enemy character 56 encountered by the event, a field 57 for progressing the game, skills 58 available during the game, and non-opened panels 59 to be specified by a player's operation instruction are displayed on the execution screen 50.

When a player specifies the non-opened panels 59, various things appear according to events associated with the panels. For example, an item 54a for generating an effect for restoring a physical power, an item 54b of virtual money such as a gold coin, the stairway 55 for proceeding to the next stage, the enemy character 56, or the like may appear. In the case of encountering the enemy character 56, a combat is started.

The combat may be a turn-based battle in which after a player selects the enemy character 56, the player attacks the enemy character 56, and then, is attacked from the enemy character 56, or may be a battle in which the player performs an attack in real time at a set speed. If the physical power value 52 of the player character becomes "0", the game is terminated.

The player may use points 53 and a skill 58 capable of generating a predetermined effect in order to advantageously process the game. The predetermined effect generated by the points 53 refer to an effect of multiplying an attacking force of a player character by a point value to strengthen the player character, or acquiring an amount of money obtained by multiplying virtual money appeared by an event by the point number, for example. After the effect is generated, the points may be consumed to become 0, or may be stored as it is.

On the other hand, through the use of the skill 58, for example, it is possible to obtain various effects such as an attack against an enemy character or restoring of a physical power value of a player character. Further, a level relating to an effect may be set in the skill 58. In a case where a high level skill is activated, an effect may change according to the level.

Figure 7:
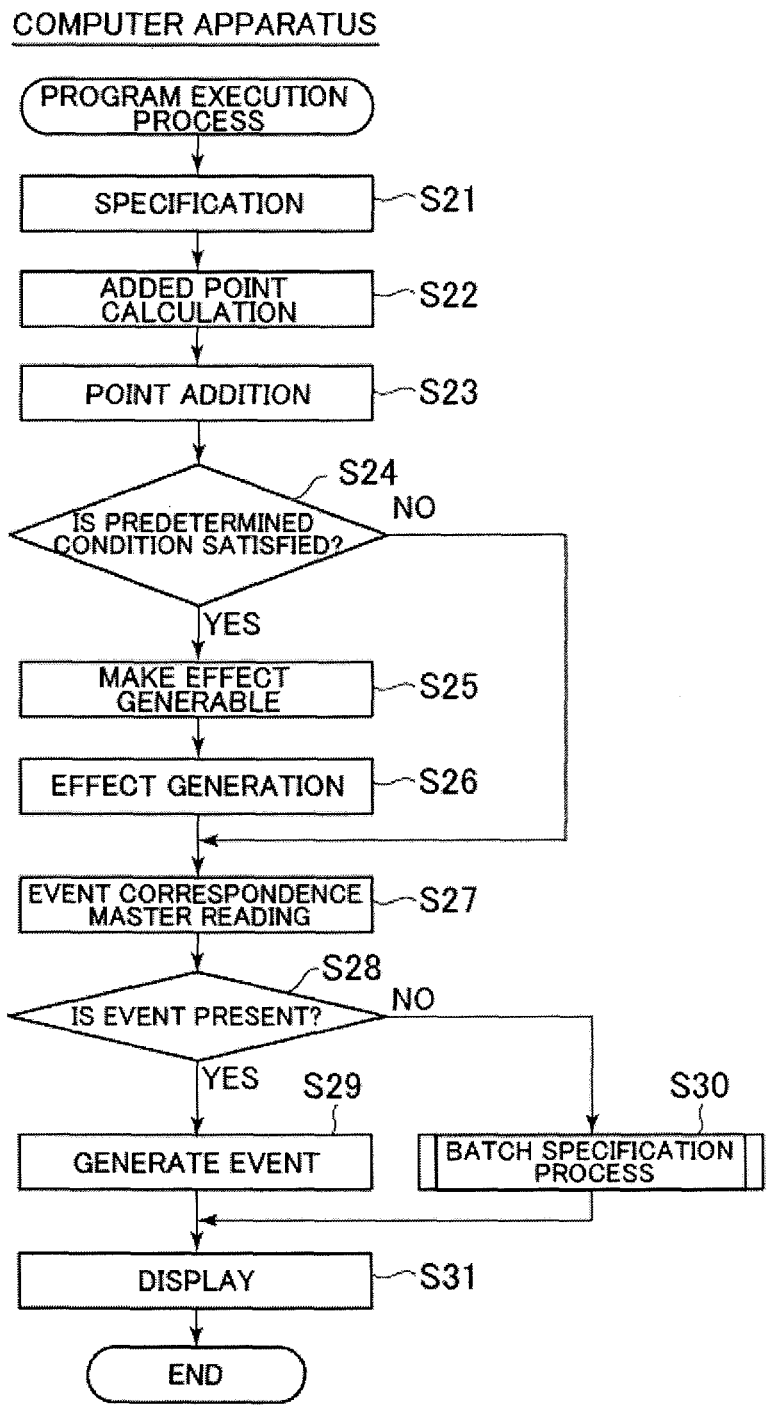
FIG. 7 is a flowchart of a program execution process corresponding to at least one of embodiments of the invention.

Next, a program execution process in the fourth embodiment of the invention will be described in detail. FIG. 7 is a flowchart of a program execution process corresponding to at least one of embodiments of the invention.

First, an object (panel) on a field is specified through an operation instruction from a player (step S21). Then, points to be added are calculated based on the specified object (step S22). The points to be added may change according to a game progressing situation.

Here, an added point calculation process will be described. FIG. 8 is a diagram showing an added point master table corresponding to at least one of embodiments of the invention. A content 202 and added points 203 are stored in an added point master table 200 in association with a condition ID 201.

A condition of which satisfaction is determined by a program is registered in the content 202. Points to be added in a case where the condition of the content 202 is satisfied are registered in the added points 203. In a case where a game progressing situation when an object is specified by a player's operation instruction satisfies a condition written in the content 202, corresponding added points 203 are calculated as added points. In a case where plural contents 202 are satisfied, a value obtained by summing the added points 203 may be used as added points.

Returning to FIG. 7, the added points calculated in step S22 are added to points stored in the storage 13 (step S23).

Then, it is determined whether a predetermined condition for making an effect generable is satisfied (step S24). The predetermined condition is a condition that points stored in the storage 13 exceed a predetermined threshold value, a condition that a predetermined time elapses, a condition that a remaining time is within a predetermined time, or a condition that objects are specified in a predetermined order, for example. That is, the predetermined condition represents a condition according to history of a game until a predetermined object is specified or a game processing situation when the predetermined object is specified.

In step 24, in a case where the predetermined condition is satisfied (YES in step 24), a predetermined effect in a game is made generable (step S25). Further, during a combat with an enemy character, the generable effect is generated by a player's operation (step S26). In a case where the predetermined condition is not satisfied (NO in step S24), the game is processed without making the predetermined effect generable.

The generation of the predetermined effect may be manually performed by a player's operation instruction as described above, or may be automatically performed through a program. In a case where the predetermined effect is automatically generated by the program, the effect may be generated immediately after the effect is made generable, or may be automatically generated in a case where a predetermined situation occurs.

For example, in a case where an event to be generated is a combat with an enemy character, the effect may be an effect of enhancing a physical power, an attacking force, a restoring force or a status of a player character, an effect of weakening an enemy defense force, an effect of reinforcing skills of a player character, or an effect of invalidating a special attack of an enemy character, or an effect of doubling an experience value or virtual money obtained after a combat is terminated.

Further, a situation where an effect is generated is not limited to a combat with an enemy character. For example, in a case where an event to be generated is an event in which contents of a predetermined number of objects are displayed even if the objects are not specified, an effect of increasing the predetermined number of displayed objects may be generated.

Further, in a case where the event is a lottery which is a so-called Gacha, an effect of increasing a lottery probability of a highly rare object or an effect of increasing the number of challenge opportunities for the Gacha may be generated.

In addition, in a case where the event is an event in which plural objects are specified to generate a single object, which is a so-called object combination, an effect of increasing a success rate of combination, or an effect of increasing an experience value obtained from the combination may be generated. Further, in a case where the event is a development of a character, an effect of increasing points for raising a status of the character to be developed may be generated.

Subsequently, in order to determine the presence or absence of an event associated with the object specified in step S21, an event correspondence master table is read from the storage 13 (step S27).

Figures 9A, 9B:
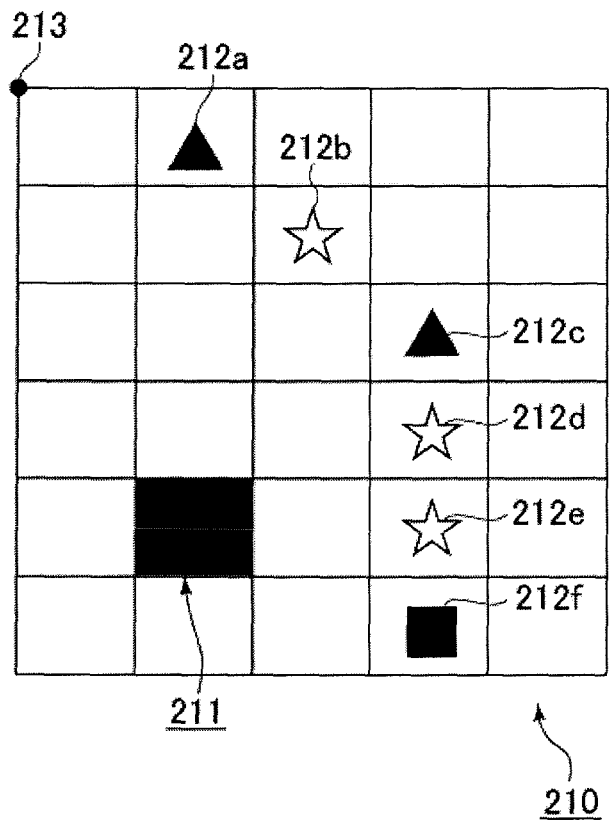
FIGS. 9A and 9B are diagrams illustrating an event correspondence master table corresponding to at least one of embodiments of the invention.

Here, an event associated with an object will be described. FIGS. 9A and 9B are diagrams illustrating an event correspondence master table corresponding to at least one of embodiments of the invention. Here, FIG. 9A shows a state of a predetermined field in a game, corresponding to at least one of embodiments of the invention. FIG. 9B shows an event correspondence master table, corresponding to at least one of embodiments of the invention.

In FIG. 9A, objects corresponding to total 30 cells of 6×5 are placed in a predetermined field 210 in a game space, and corresponding events are registered in cell objects where signs 212 are shown in the cells.

Events corresponding to the objects shown in FIG. 9A are displayed based on data registered in the event correspondence master table shown in FIG. 9B. The event correspondence master table 220 in FIG. 9B stores an event 223 in association with an ordinate 221 and an abscissa 222.

The ordinate 221 and the abscissa 222 are represented based on cardinal points 213 in FIG. 9A. For example, an event 223 of which the ordinate 221 is "1" and the abscissa 222 is "2" is "damaged at a poisonous pond", and corresponds to an upward black triangle sign 212a in FIG. 9A. Further, a white star sign 212b and a black rectangle sign 212f respectively correspond to events such as "item acquisition" or "enemy character encounter".

In the above-described embodiment, the event correspondence master table 220 is configured so that the event 223 can be specified only from the ordinate 221 and the abscissa 222, but the invention is not limited to this embodiment. For example, a configuration in which an event is generated based on an order where a player specifies objects from the beginning of a game may be used. In this way, it is possible to motivate a player to process a game while recognizing an order where the player specifies objects, and to enhance an interest of the player while increasing the degree of difficulty of the game.

Returning to the flowchart in FIG. 7, the presence or absence of an event corresponding to a specified object is determined using the event correspondence master table read in step S27 (step S28). In a case where the corresponding event is present (YES in step S28), the corresponding event is generated (step S29), and then, an event calculation process is performed in the controller 11 and the graphics processor 15, and the result is displayed on the display device 22. On the other hand, in a case where the corresponding event is not present (NO in step S28), a batch specification process is performed (step S30).

Figure 10A:
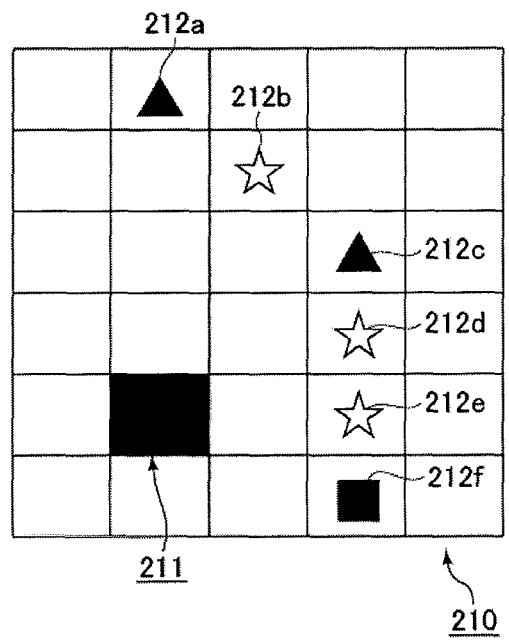
FIGS. 10A and 10B are diagrams showing states before and after execution of the batch specification process, corresponding to at least one of embodiments of the invention.
Figure 10B:
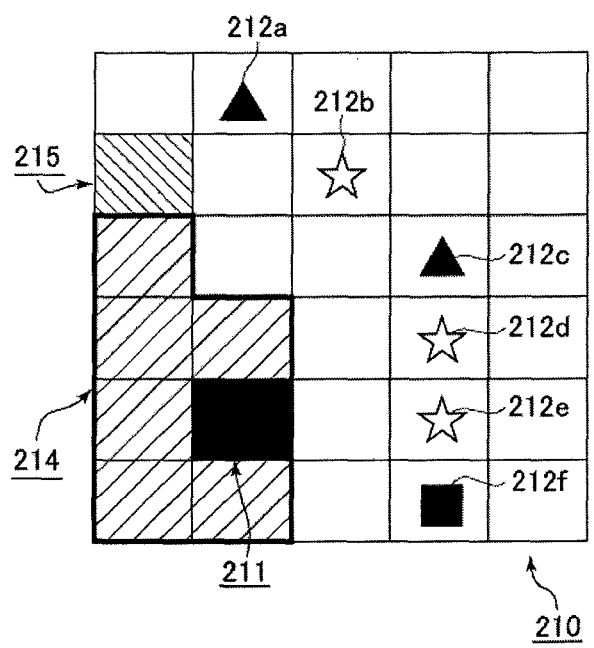

Here, the batch specification process will be described. FIGS. 10A and 10B are diagrams showing states before and after execution of the batch specification process, corresponding to at least one of embodiments of the invention. FIG. 10A shows a state before the batch specification process. Contents indicated by signs 212 are the same as in FIG. 9.

The batch specification process is a process of specifying seven cells in an area 214 shown in FIG. 10B when a player specifies a certain object 211 in a state where all objects included in a field are not yet specified, for example.

Figure 11:
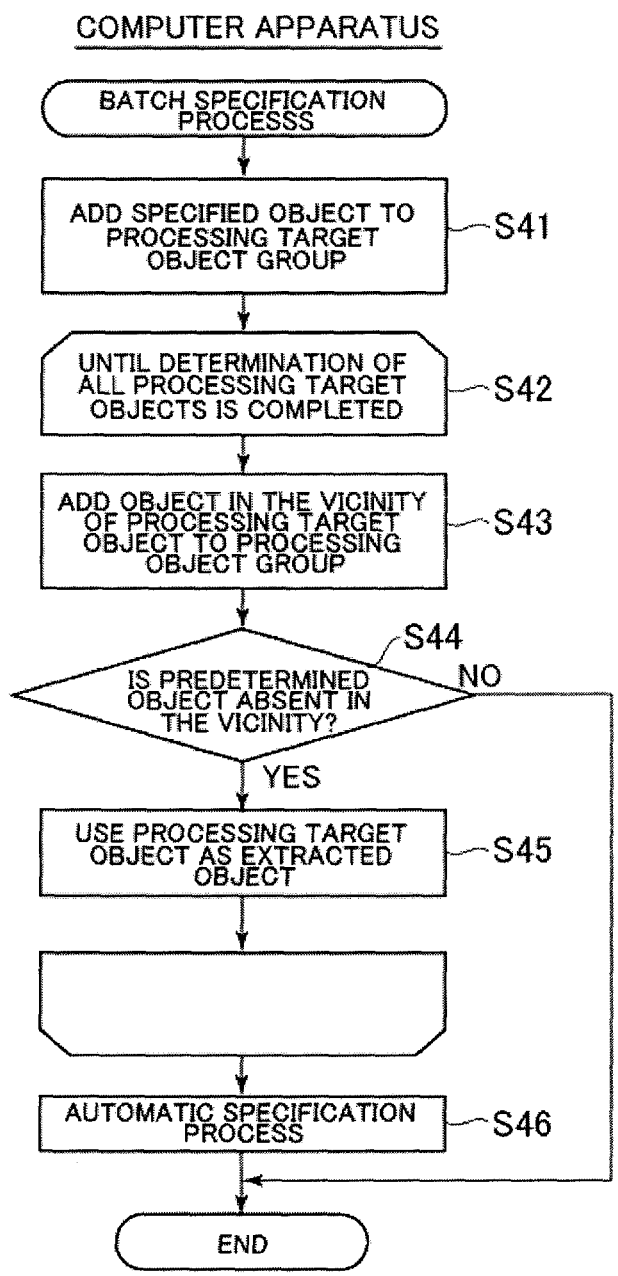
FIG. 11 is a flowchart of a batch specification process corresponding to at least one of embodiments of the invention.

The batch specification process will be described in more detail with reference to the following figure. FIG. 11 is a flowchart of a batch specification process corresponding to at least one of embodiments of the invention. First, a specified object is added to a processing target object group which is a determination process target (step S41). Then, one object included in the processing target object group is set to a processing target object which is a target object to be processed, and an object that is present in the vicinity of the processing target object is also added to the processing target object group (step S43).

It is determined whether a predetermined object associated with an event is absent among new objects which are set as processing targets in step S43 (step S44). In a case where the predetermined object is absent (YES in step 44), the processing target object is marked as an extracted object (step S45).

After the processing target object is marked as the extracted object, or in a case where the predetermined object is present in the vicinity (NO in step S44), the process with respect to the processing target object is completed. Then, the next object included in the processing target object group is set as a processing target object, and the processes from step S43 are repeated. The repletion is performed until the determination is completed with respect to all the objects included in the processing target object group (step S42).

After the determination is completed with respect to all the objects included in the processing target object group, the game process is automatically performed using the extracted objects as the specified objects (step S46).

Returning to the flowchart in FIG. 7, the events generated in step S29 or the results obtained through the batch specification process in step S30 are displayed on the display screen 23 (step S31).

In display, a display mode of a specified object or a field corresponding to the specified object is changed according to a positional relationship between a position of the specified object and a position of an event-associated object.

Figure 12:
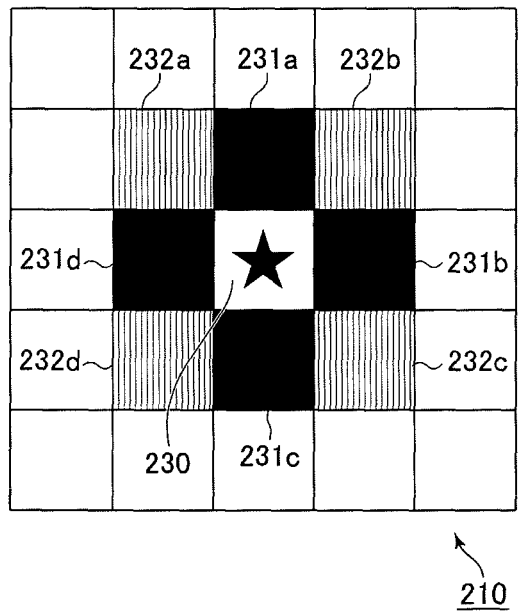
FIG. 12 is a diagram showing a change of a display mode, corresponding to at least one of embodiments of the invention.

FIG. 12 is a diagram showing a change of a display mode, corresponding to at least one of embodiments of the invention. Objects corresponding to total 25 cells of 5×5 are placed in a predetermined field 210 in a game space. An object placed on the outermost side is an object with no change in its display mode.

In a case where an event is associated with a central object 230, peripheral objects 231 and 232 are changed in their display modes according to positional relationships to be displayed, for example. In FIG. 12, display modes of the objects 231 on up and down sides and left and right sides of the event-associated object, and display modes of the objects 232 on upper left, upper right, lower right and lower left sides thereof are different from each other, but the display modes may be the same.

In the fourth embodiment, an applicable game field is a card game, a race game, a music game, a role playing game, or the like, but is not limited thereto.

According to an aspect of the fourth embodiment, since points to be added change according to a game progressing situation when an object is specified, a player can strategically store points while considering the game progressing situation, and thus, it is possible to provide a strategic and interesting game.

According to another aspect of the fourth embodiment, it is possible to generate an effect by consuming points, and thus, it is possible to motivate a player to store points with high efficiency in order to generate an effect.

According to still another aspect of the fourth embodiment, by providing a batch specification process, a player can efficiently play a game without stress, without repeating unnecessary specification operations.

In the fourth embodiment, the "computer apparatus", the "game", the "operation instruction", the "field", the "object", the "event", the "display mode of the field", the "positional relationship between positions of objects", the "history of the game", the "processing situation of the game", and the "effect" are the same as the contents disclosed in the first embodiment, respectively.

Fifth Embodiment

Figure 13:
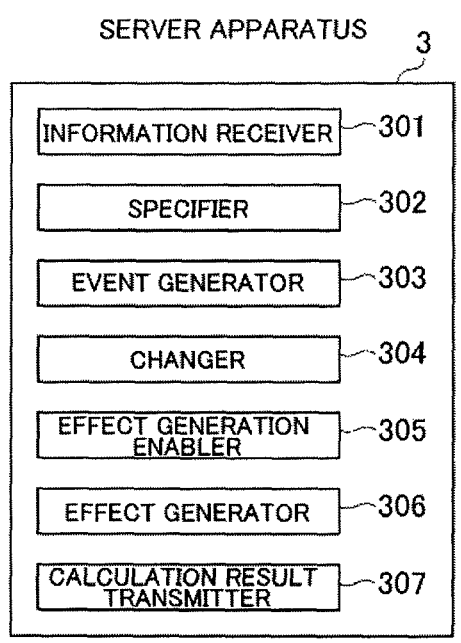
FIG. 13 is a block diagram showing a configuration of a server apparatus corresponding to at least one of embodiments of the invention.

Next, an outline of a fifth embodiment of the invention will be described. FIG. 13 is a block diagram showing a configuration of a server apparatus corresponding to at least one of embodiments of the invention. A server apparatus 3 includes at least an information receiver 301, a specifier 302, an event generator 303, a changer 304, an effect generation enabler 305, an effect generator 306, and a calculation result transmitter 307.

The information receiver 301 has a function of receiving information relating to a player's operation instruction transmitted from the computer apparatus 1. The specifier 302 has a function of specifying an object placed in a field according to information received by the information receiver 301. The event generator 303 has a function of generating a predetermined event in a case where a predetermined object corresponding to the predetermined event is specified by the specifier 302.

The changer 304 has a function of changing, in a case where an object is specified by the specifier 302, a display mode of the specified object or a field corresponding to the specified object according to a positional relationship between a position of the specified object and a position of the predetermined object.

The effect generation enabler 305 has a function of making a predetermined effect in a game generable according to a history of the game until a predetermined object is specified or a progressing situation of the game when the predetermined object is specified. The effect generator 306 has a function of generating an effect that is made generable by the effect generation enabler. The calculation result transmitter 307 has a function of transmitting a calculation result with respect to an event generated by the event generator 303 or an effect generated in the effect generator 306 to the computer apparatus 1.

Figure 14:
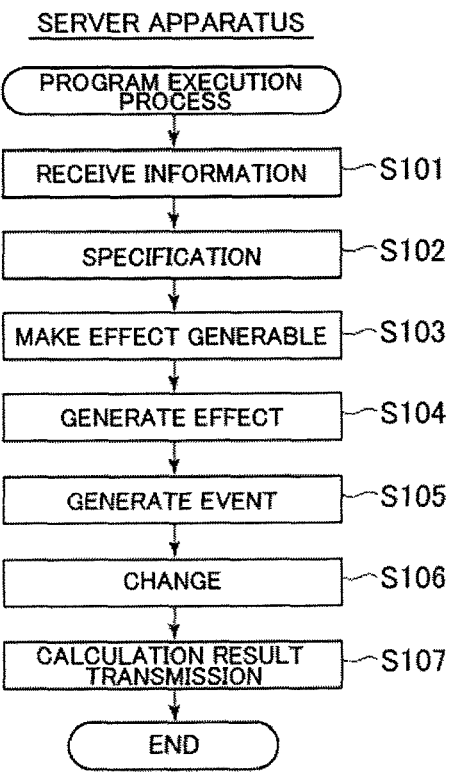
FIG. 14 is a flowchart of a program execution process corresponding to at least one of embodiments of the invention.

A program execution process in the fifth embodiment of the invention will be described. FIG. 14 is a flowchart of a program execution process corresponding to at least one of embodiments of the invention.

The server apparatus 3 receives information from the computer apparatus 1 (step S101). The server apparatus 3 receives specification of an object placed in a field according to the received information (step S102).

Then, the server apparatus 3 makes a predetermined effect in a game generable according to a history of the game until a predetermined object is specified or a progressing situation of the game when the predetermined object is specified (step S103). Further, the server apparatus 3 generates the generable effect (step S104).

Then, in a case where a predetermined object associated with a predetermined event is specified in step S102, the server apparatus 3 generates the predetermined event (step S105). In a case where the object is specified in step S102, the server apparatus 3 changes a display mode of the specified object or a field corresponding to the specified object according to a positional relationship between a position of the specified object and a position of the predetermined object (step S106).

Finally, the server apparatus 3 transmits the information relating to the calculation result to the computer apparatus (step S107), and terminates the procedure.

According to an aspect of the fifth embodiment, by generating a predetermined effect in a game according to a history of the game until a predetermined object is specified or a progressing situation of the game when the predetermined object is specified, it is possible to provide a strategic and interesting game.

In the fifth embodiment, the "computer apparatus", the "game", the "operation instruction", the "field", the "object", the "event", the "display mode of the field", the "positional relationship between positions of objects", the "history of the game", the "processing situation of the game", and the "effect" are the same as the contents disclosed in the first embodiment, respectively.

In the fifth embodiment, the "server apparatus" refers to an apparatus that executes a process according to a requirement from a terminal apparatus, for example. The "information relating to the calculation result" refers to a result of a calculation performed by the server apparatus, for example, and includes a result relating to a generated event and a generated effect.

Sixth Embodiment

Figure 15:
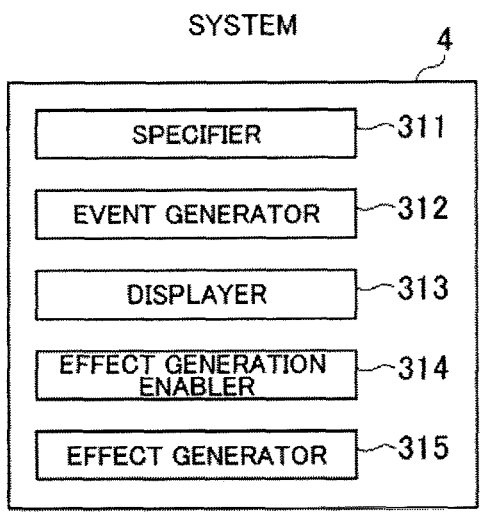
FIG. 15 is a block diagram showing a configuration of a system corresponding to at least one of embodiments of the invention.

Next, an outline of a sixth embodiment of the invention will be described. FIG. 15 is a block diagram showing a configuration of a system corresponding to at least one of embodiments of the invention. A system 4 includes at least a specifier 311, an event generator 312, a displayer 313, an effect generation enabler 314, and an effect generator 315.

The specifier 311 has a function of specifying an object placed in a field according to a player's operation instruction. The event generator 312 has a function of generating a predetermined event in a case where a predetermined object corresponding to the predetermined event is specified by the specifier 311.

The displayer 313 has a function of changing, in a case where an object is specified by the specifier 311, a display mode of the specified object or a field corresponding to the specified object according to a positional relationship between a position of the specified object and a position of the predetermined object for display.

The effect generation enabler 314 has a function of making a predetermined effect in a game generable according to a history of the game until a predetermined object is specified or a progressing situation of the game when the predetermined object is specified. The effect generator 315 has a function of generating an effect that is made generable by the effect generation enabler.

Figure 16:
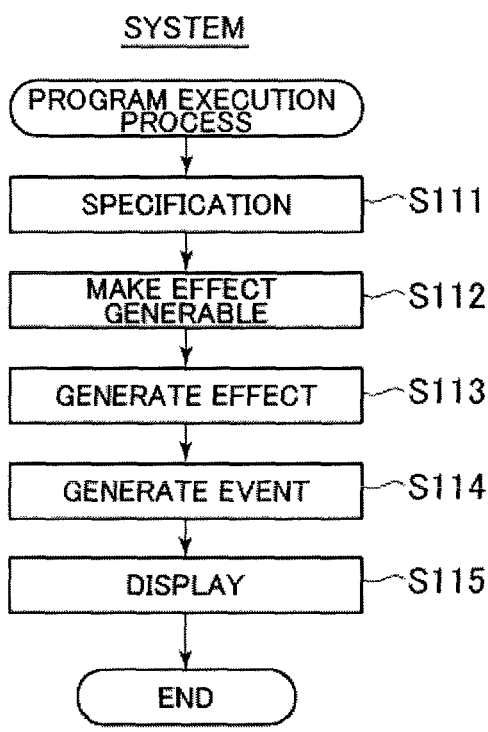
FIG. 16 is a flowchart of a program execution process corresponding to at least one of embodiments of the invention.

A program execution process in the sixth embodiment of the invention will be described. FIG. 16 is a flowchart of a program execution process corresponding to at least one of embodiments of the invention.

The system 4 receives specification of an object placed in a field according to a player's operation instruction (step S111). Then, the system 4 makes a predetermined effect in a game generable according to a history of the game until a predetermined object is specified or a progressing situation of the game when the predetermined object is specified (step S112). Further, the system 4 generates the generable effect (step S113).

Subsequently, in a case where a predetermined object associated with a predetermined event is specified in step S111, the system 4 generates the predetermined event (step S114). Finally, in a case where an object is specified in step S111, the system 4 changes a display mode of the specified object or a field corresponding to the specified object according to a positional relationship between a position of the specified object and a position of the predetermined object for display (step S115), and then, terminates the procedure.

According to an aspect of the sixth embodiment, by making a predetermined effect in a game generable according to a history of the game until a predetermined object is specified or a progressing situation of the game when the predetermined object is specified, it is possible to provide a strategic and interesting game.

In the sixth embodiment, the "computer apparatus", the "game", the "operation instruction", the "field", the "object", the "event", the "display mode of the field", the "positional relationship between positions of objects", the "history of the game", the "processing situation of the game", and the "effect" are the same as the contents disclosed in the first embodiment, respectively.

In the sixth embodiment, the "server apparatus" is the same as the content disclosed in the fifth embodiment. In the sixth embodiment, the "system" refers to a combination of hardware, software, a network, and the like, for example.

Seventh Embodiment

Figure 17:
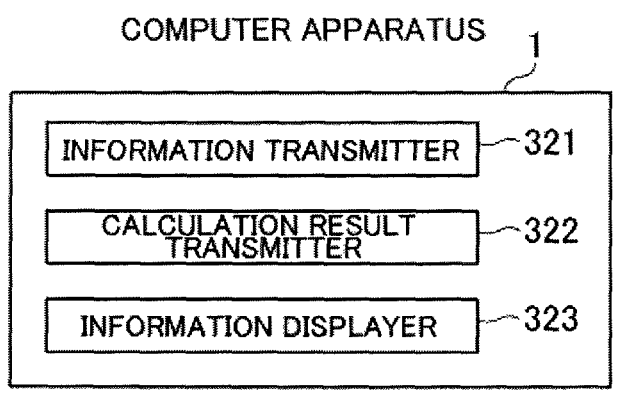
FIG. 17 is a block diagram showing a configuration of a computer apparatus corresponding to at least one of embodiments of the invention.

Next, an outline of a seventh embodiment of the invention will be described. FIG. 17 is a block diagram showing a configuration of a computer apparatus corresponding to at least one of embodiments of the invention. A computer apparatus 1 includes at least an information transmitter 321, a calculation result receiver 322, and an information displayer 323.

The information transmitter 321 has a function of transmitting information relating to a player's operation instruction to a server apparatus 3 from the computer apparatus 1. The calculation result receiver 322 has a function of receiving information relating to a calculation result from the server apparatus 3. The information displayer 323 has a function of displaying the information relating to the calculation result received by the calculation result receiver 322 on a display device.

Figure 18:
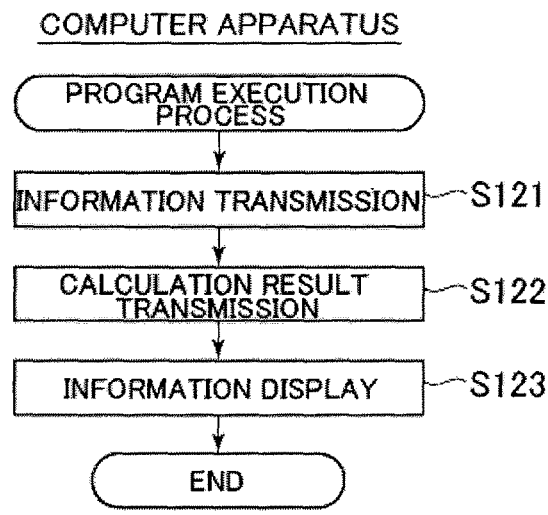
FIG. 18 is a flowchart of a program execution process corresponding to at least one of embodiments of the invention.

A program execution process in the seventh embodiment of the invention will be described. FIG. 18 is a flowchart of a program execution process corresponding to at least one of embodiments of the invention.

The computer apparatus 1 transmits information to the server apparatus 3 (step S121). The computer apparatus 1 receives a calculation result obtained by a calculation process in the server apparatus 3 (step S122). The computer apparatus 1 displays information based on the received calculation result (step S123), and then, terminates the procedure.

According to an aspect of the seventh embodiment, by making a predetermined effect in a game generable according to a history of the game until a predetermined object is specified or a progressing situation of the game when the predetermined object is specified, it is possible to provide a strategic and interesting game.

In the seventh embodiment, the "computer apparatus", the "game", the "operation instruction", the "field", the "object", the "event", the "display mode of the field", the "positional relationship between positions of objects", the "history of the game", the "processing situation of the game", and the "effect" are the same as the contents disclosed in the first embodiment, respectively.

In the seventh embodiment, the "server apparatus" and the "information relating to the calculation result" are the same as the contents disclosed in the fifth embodiment.

Eighth Embodiment

Figure 19:
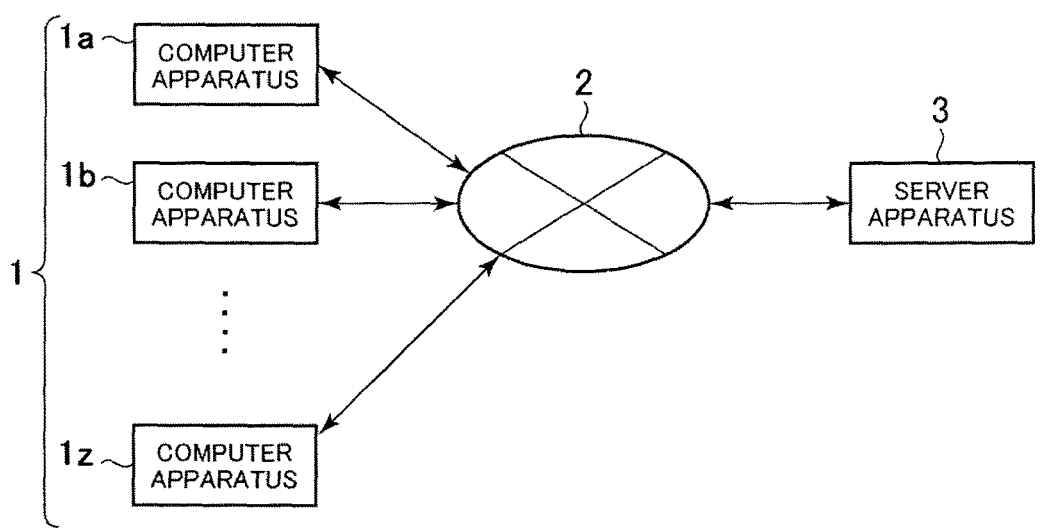
FIG. 19 is a block diagram showing a configuration of a system corresponding to at least one of embodiments of the invention.

Next, an outline of an eighth embodiment of the invention will be described. FIG. 19 is a block diagram showing a configuration of a system corresponding to at least one of embodiments of the invention. As shown in the figure, the system includes plural computer apparatuses 1 (computer apparatuses 1a, 1b, . . . , 1z) operated by plural users (users A, B, . . . , Z), a server apparatus 3, and a communication network 2. The computer apparatuses 1 are connected to the server apparatus 3 through the communication network 2. The computer apparatuses 1 may not be constantly connected to the server apparatus 3, and may be connected thereto as necessary.

A configuration of the computer apparatus according to the eighth embodiment may employ the same configuration as that shown in the block diagram of the computer apparatus in FIG. 5. Further, an execution screen of a program according to the eighth embodiment may employ the same execution screen as the embodiment of the execution screen in FIG. 6.

Figure 20:
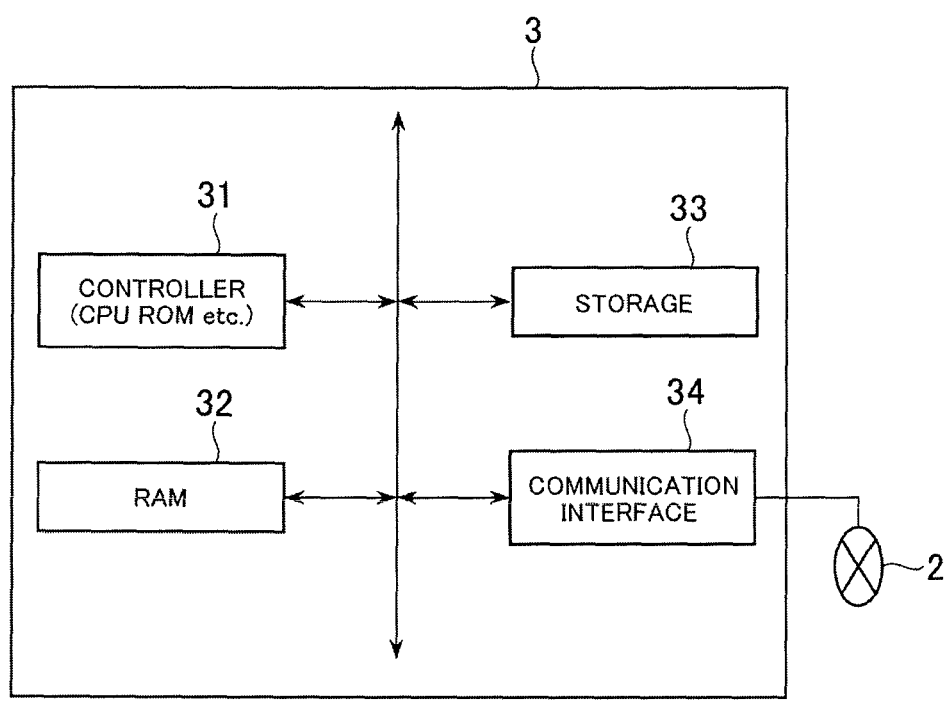
FIG. 20 is a block diagram showing a configuration of a server apparatus corresponding to at least one of embodiments of the invention.

FIG. 20 is a block diagram showing a configuration of a server apparatus corresponding to at least one of embodiments of the invention. The server apparatus 3 includes a controller 31, a random access memory (RAM) 32, a storage 33, and a communication interface 34, which are connected to each other through an internal bus.

The controller 31 includes a central processing unit (CPU) and a read only memory (ROM). The controller 31 executes a program stored in the storage 33 to control the server apparatus 3. Further, the controller 31 includes an internal timer that clocks time. The RAM 32 is a work area of the controller 31. The storage 33 is a storage area for storing a program or data. The controller 31 reads the program and data from the RAM 32, and performs a program execution process based on requirement information received from the computer apparatus 1.

Figure 21:
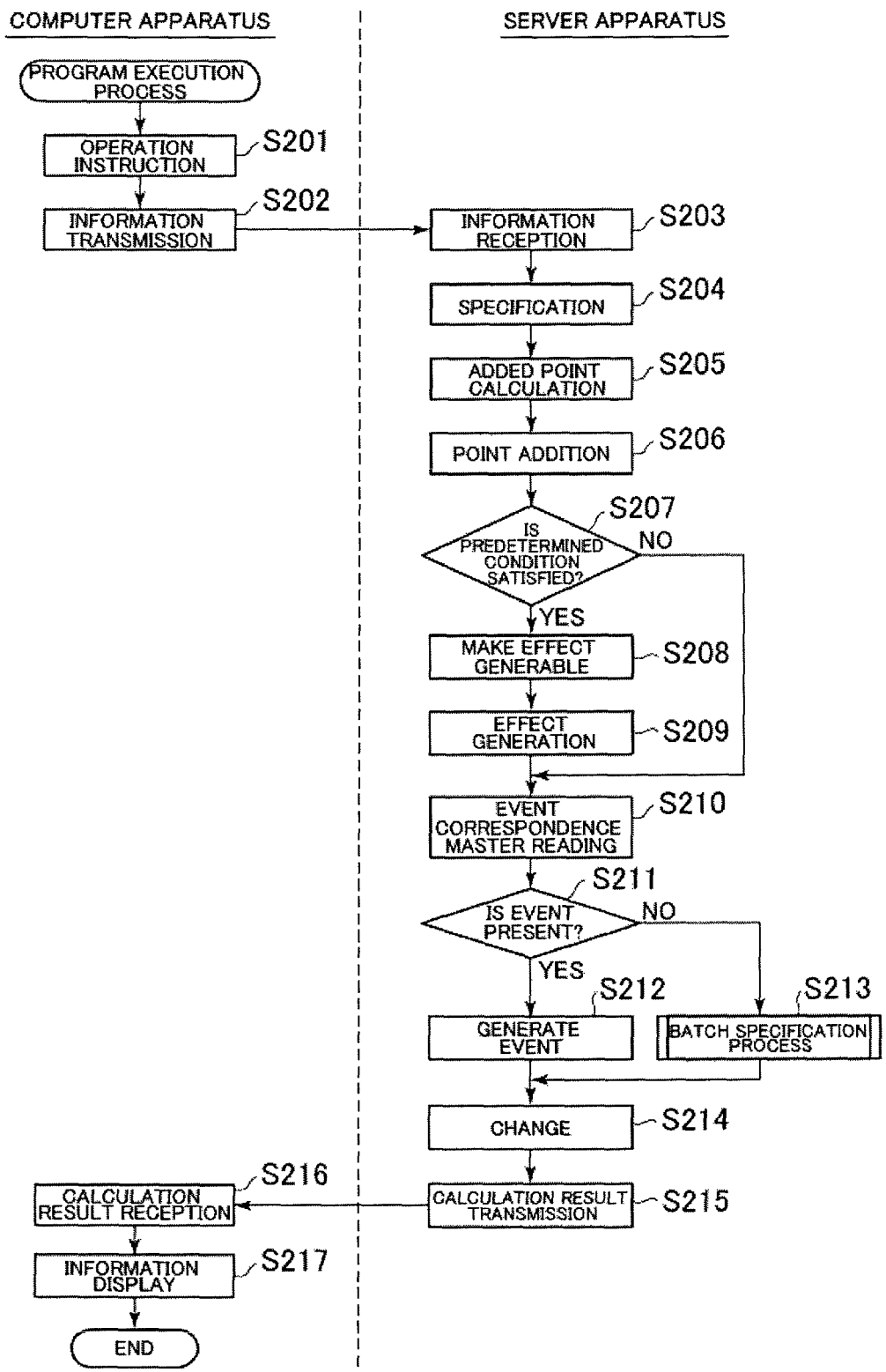
FIG. 21 is a flowchart of a program execution process corresponding to at least one of embodiments of the invention.

Next, a program execution process in the eighth embodiment of the invention will be described. FIG. 21 is a flowchart of a program execution process corresponding to at least one of embodiments of the invention.

A player performs an operation instruction with respect to the computer apparatus 1 (step S201). The computer apparatus 1 transmits information relating to the operation instruction (step S202).

The server apparatus 3 receives information from the computer apparatus 1 (step S203). The server apparatus 3 receives specification of an object placed in a field according to the received information (step S204).

Then, the server apparatus 3 calculates points to be added based on the specified object (step S205). In the calculation of the added points, the added point calculation process performed in step S22 of the fourth embodiment may be applied to the server apparatus 3.

The added points calculated in step S205 are added to points stored in the storage 33 (step S206).

Then, it is determined whether a predetermined condition for making an effect generable is satisfied (step S207). The predetermined condition is a condition that points stored in the storage 33 exceed a predetermined threshold value, a condition that a predetermined time elapses, a condition that a remaining time is within a predetermined time, or a condition that objects are specified in a predetermined order, for example. That is, the predetermined condition represents a condition according to a history of a game until a predetermined object is specified or a game processing situation when the predetermined object is specified.

In step S207, in a case where the predetermined condition is satisfied (YES in step S207), a predetermined effect in a game is made generable (step S208), and the generable effect is generated (step S209). In a case the predetermined condition is not satisfied (NO in step S207), the procedure proceeds to the next step without making the predetermined effect generable.

The generation of the predetermined effect may be manually performed by a player's operation instruction in step S201, or may be automatically performed through a program. In a case where the predetermined effect is automatically generated by the program, the effect may be generated immediately after the effect is made generable, or may be automatically generated in a case where a predetermined situation occurs.

For example, in a case where an event to be generated is a combat with an enemy character, the effect may be an effect of enhancing a physical power, an attacking force, a restoring force or a status of a player character, an effect of weakening an enemy defense force, an effect of reinforcing skills of a player character, or an effect of invalidating a special attack of an enemy character, or an effect of doubling an experience value or virtual money obtained after a combat is terminated.

A situation where an effect is generated is not limited to a combat with an enemy character. For example, in a case where an event to be generated is an event in which contents of a predetermined number of objects are displayed even if the objects are not specified, an effect of increasing the predetermined number of displayed objects may be generated.

Further, in a case where the event is a lottery which is a so-called Gacha, an effect of increasing a lottery probability of a highly rare object or an effect of increasing the number of challenge opportunities for the Gacha may be generated.

In addition, in a case where the event is an event in which plural objects are specified to generate a single object, which is a so-called object combination, an effect of increasing a success rate of combination, or an effect of increasing an experience value obtained from the combination may be generated. Further, in a case where the event is a development of a character, an effect of increasing points for raising a status of the character to be developed may be generated.

Then, in order to determine the presence or absence of an event associated with the object specified in step S204, an event correspondence master table is read from the storage 33 (step S210). A configuration of the event correspondence master table may employ the same configuration as the embodiment of the event correspondence master table shown in FIG. 9.

The presence or absence of the event corresponding to the specified object is determined using the event correspondence master table read in step S210 (step S211). In a case where the corresponding event is present (YES in step S211), the corresponding event is generated (step S212), and then, an event calculation process is performed in the controller 31.

On the other hand, in a case where the corresponding event is not present (NO in step S211), a batch specification process is performed (step S213). The batch specification process may employ the batch specification process in step S30 of the fourth embodiment in the server apparatus 3.

Then, a display mode of a specified object in step S204 or a field corresponding to the specified object is changed according to a positional relationship between a position of the specified object and a position of the object with which the event is associated (step S214). The display mode change process may employ the same process as the embodiment of the display mode change shown in FIG. 12.

The server apparatus 3 performs calculation with respect to an event generated in step S212, a result obtained through the batch specification process in step S213, and a generated effect in a case where the effect is generated, and then transmits the calculation result to the computer apparatus 1 (step S215).

The computer apparatus 1 receives the calculation result transmitted in step S215 (step S216). Then, the computer apparatus 1 displays the received calculation result on the display screen 23 (step S217), and then, terminates the procedure.

In the eighth embodiment, an applicable game field is a card game, a race game, a music game, a role play game, or the like, but is not limited thereto.

According to an aspect of the eighth embodiment, since points to be added change according to a processing situation of a game when an object is specified, a player can strategically store points while considering the processing situation of the game, and thus, it is possible to provide a strategic and interesting game.

According to another aspect of the eighth embodiment, it is possible to make an effect generable by consuming points, and thus, it is possible to motivate a player to store the points with high efficiency in order to generate an effect.

According to still another aspect of the eighth embodiment, by providing a batch specification process, a player can efficiently play a game without stress, without repeating unnecessary specification operations.

According to still another aspect of the eighth embodiment, by making a predetermined effect in a game generable according to a history of the game until a predetermined object is specified or a progressing situation of the game when the predetermined object is specified, it is possible to provide a strategic and interesting game.

In the eighth embodiment, the "computer apparatus", the "game", the "operation instruction", the "field", the "object", the "event", the "field display mode", the "positional relationship between positions of objects", the "history of the game", the "game progressing situation", and the "effect" are the same as the contents disclosed in the first embodiment, respectively.

In the eighth embodiment, the "server apparatus" and the "information relating to the calculation result" are the same as the contents disclosed in the fifth embodiment.

Appendix

The above-described embodiments are disclosed so that those skilled in the art can perform the following inventions.

[1] A game program executed in a computer apparatus that causes the computer apparatus to function as:

a specifier that specifies an object placed in a field according to a player's operation instruction;

an event generator that generates, in a case where a predetermined object corresponding to a predetermined event is specified by the specifier, the predetermined event;

a displayer that changes, in a case where an object is specified by the specifier, a display mode of the specified object or a field corresponding to the specified object according to a positional relationship between a position of the specified object and a position of the predetermined object for display;

an effect generation enabler that makes a predetermined effect in a game generable according to a history of a game until the predetermined object is specified or a progressing situation of the game when the predetermined object is specified; and an effect generator that generates an effect that is made generable by the effect generation enabler.

[2] The game program according to [1], causing the computer apparatus to further function as:

a point storage in which points are added and stored if an object is specified by the specifier, wherein the effect generation enabler makes a predetermined effect generable in a case where points stored in the point storage are equal to or greater than a predetermined threshold value.

[3] The game program according to [1] or [2], wherein the effect generator generates a predetermined effect with respect to a predetermined event generated by the event generator.

[4] The game program according to any one of [1] to [3], wherein the history of the game until the predetermined object is specified is the number of times of object specification in the specifier.

[5] The game program according to any one of [1] to [3], wherein the history of the game until the predetermined object is specified is a period of time from a predetermined point of time to a point of time when the predetermined object is specified by the specifier.

[6] The game program according to any one of [2] to [5], wherein the points added by the point storage change according to a processing situation of the game when an object is specified by the specifier.

[7] The game program according to any one of [2] to [6], wherein in a case where the predetermined object is specified by the specifier, points are consumed by a point consumer to generate a predetermined effect by the effect generator.

[8] The game program according to any one of [1] to [7], causing the computer apparatus to further function as:

an extractor that extracts, in a case where a predetermined object is not present in the vicinity of an object specified by the specifier, an object which is present in the vicinity of the specified object; and an automatic processor that automatically performs a game process with respect to the object extracted by the extractor, using the object extracted by the extractor as the object specified by the specifier.

[9] The game program according to [8], wherein the extractor further extracts, in a case where a predetermined object is not present in the vicinity of the extracted object, an object which is present in the vicinity of the extracted object.

[10] The game program according to any one of [1] to [9], wherein an event to be generated in the event generator is a combat with an enemy character.

[11] A computer apparatus comprising:

a specifier that specifies an object placed in a field according to a player's operation instruction;

an event generator that generates, in a case where a predetermined object corresponding to a predetermined event is specified by the specifier, the predetermined event;

a displayer that changes, in a case where an object is specified by the specifier, a display mode of the specified object or a field corresponding to the specified object according to a positional relationship between a position of the specified object and a position of the predetermined object for display;

an effect generation enabler that makes a predetermined effect in a game generable according to a history of a game until the predetermined object is specified or a progressing situation of the game when the predetermined object is specified; and an effect generator that generates an effect that is made generable by the effect generation enabler.

[12] A game processing method executed in a computer apparatus, comprising:

a step of specifying an object placed in a field according to a player's operation instruction;

a step of generating, in a case where a predetermined object corresponding to a predetermined event is specified, the predetermined event;

a step of changing, in a case where an object is specified, a display mode of the specified object or a field corresponding to the specified object according to a positional relationship between a position of the specified object and a position of the predetermined object for display;

a step of making a predetermined effect in a game generable according to a history of a game until the predetermined object is specified or a progressing situation of the game when the predetermined object is specified; and a step of generating a generable effect.

[13] A game program executed in a server apparatus which is connectable to a computer apparatus through communication, causing the server apparatus to function as:

an information receiver that receives information relating to a player's operation instruction from the computer apparatus;

a specifier that specifies an object placed in a field according to the received information;

an event generator that generates, in a case where a predetermined object corresponding to a predetermined event is specified by the specifier, the predetermined event;

a changer that changes, in a case where an object is specified by the specifier, a display mode of the specified object or a field corresponding to the specified object according to a positional relationship between a position of the specified object and a position of the predetermined object;

an effect generation enabler that makes a predetermined effect in a game generable according to a history of a game until the predetermined object is specified or a progressing situation of the game when the predetermined object is specified;

an effect generator that generates an effect that is made generable by the effect generation enabler; and a calculation result transmitter that transmits information relating to a calculation result to the computer apparatus.

[14] A server apparatus in which the game program according to [13] is installed.

[15] A system that includes a computer apparatus and a server apparatus that is connectable to the computer apparatus through communication, comprising:

a specifier that specifies an object placed in a field according to a player's operation instruction;

an event generator that generates, in a case where a predetermined object corresponding to a predetermined event is specified by the specifier, the predetermined event;

a displayer that changes, in a case where an object is specified by the specifier, a display mode of the specified object or a field corresponding to the specified object according to a positional relationship between a position of the specified object and a position of the predetermined object for display;

an effect generation enabler that makes a predetermined effect in a game generable according to a history of a game until the predetermined object is specified or a progressing situation of the game when the predetermined object is specified; and an effect generator that generates an effect that is made generable by the effect generation enabler.

[16] A game program executed in a computer apparatus that is connectable to a server apparatus through communication, wherein the server apparatus receives information relating to a player's operation instruction from the computer apparatus; specifies an object placed in a field according to the received information; generates, in a case where a predetermined object corresponding to a predetermined event is specified, the predetermined event; changes, in a case where an object is specified, a display mode of the specified object or a field corresponding to the specified object according to a positional relationship between a position of the specified object and a position of the predetermined object; makes a predetermined effect in a game generable according to a history of a game until the predetermined object is specified or a progressing situation of the game when the predetermined object is specified; generates a generable effect; and transmits information relating to a calculation result to the computer apparatus, and wherein the game program causes the computer apparatus to function as:

an information transmitter that transmits information relating to the player's operation instruction to the server apparatus, a calculation result receiver that receives the information relating to the calculation result from the server apparatus, and an information displayer that displays the received information relating to the calculation result on a display device.

[17] A computer apparatus in which the game program according to [16] is installed.

[18] A game processing method executed in a server apparatus that is connectable to a computer apparatus through communication, comprising:

a step of receiving information relating to a player's operation instruction from the computer apparatus;

a step of specifying an object placed in a field according to the received information;

a step of generating, in a case where a predetermined object corresponding to a predetermined event is specified, the predetermined event;

a step of changing, in a case where an object is specified, a display mode of the specified object or a field corresponding to the specified object according to a positional relationship between a position of the specified object and a position of the predetermined object;

a step of making a predetermined effect in a game generable according to a history of a game until the predetermined object is specified or a progressing situation of the game when the predetermined object is specified;

a step of generating a generable effect; and a step of transmitting information relating to a calculation result to the computer apparatus.

[19] A game processing method executed in a system that includes a computer apparatus and a server apparatus that is connectable to the computer apparatus through communication, comprising:

a step of specifying an object placed in a field according to a player's operation instruction;

a step of generating, in a case where a predetermined object corresponding to a predetermined event is specified, the predetermined event;

a step of changing, in a case where an object is specified, a display mode of the specified object or a field corresponding to the specified object according to a positional relationship between a position of the specified object and a position of the predetermined object for display;

a step of making a predetermined effect in a game generable according to a history of a game until the predetermined object is specified or a progressing situation of the game when the predetermined object is specified; and a step of generating a generable effect.

The invention claimed is:

1. A non-transitory computer-readable recording medium having recorded thereon a game program which is executed in a computer apparatus that causes the computer apparatus to perform operations comprising:

making a predetermined effect generable in a game according to a history of the game, the predetermined effect being generable until a predetermined object is specified or the game progresses to a progressing situation in which the predetermined object is specified;

generating the predetermined effect that is made generable;

specifying an object placed in a field of the game according to an operation instruction of a player;

adding the specified object to a processing target object group and performing a batch specification process, the batch specification process including:

setting one object in the processing target object group to a processing target object, and adding an object adjacent the processing target object to the processing target object group;

determining whether the predetermined object corresponding to a predetermined event is absent among new objects added to the processing target object group;

marking, in a case where the predetermined object is absent, the processing target object as an extracted object, and repeating the batch specification process for each object in the processing target object group; and generating, in a case where the predetermined object is present, the predetermined event;

displaying results of the batch specification process on a display screen; and changing a display mode of the specified object or a field corresponding to the specified object according to a positional relationship between a position of the specified object and a position of the predetermined object.

2. The non-transitory computer-readable recording medium according to claim 1, the operations further comprising:
adding and storing points in a point storage when the object is specified according to the operation instruction of the player,
wherein the predetermined effect is made generable in a case where the points stored in the point storage are equal to or greater than a predetermined threshold value.

3. The non-transitory computer-readable recording medium according to claim 1,
wherein the predetermined effect is generated with respect to the predetermined event.

4. The non-transitory computer-readable recording medium according to claim 1,
wherein the history of the game until the predetermined object is specified is a number of times of object specification according to the operation instruction of the player.

5. The non-transitory computer-readable recording medium according to claim 1,
wherein the history of the game until the predetermined object is specified is a period of time from a predetermined point of time to a point of time when the predetermined object is specified.

6. The non-transitory computer-readable recording medium according to claim 2,
wherein the points added to the point storage when the object is specified change according to a processing situation of the game.

7. The non-transitory computer-readable recording medium according to claim 2,
wherein, in a case where the predetermined object is specified according to the operation instruction of the player, the points are consumed to generate the predetermined effect.

8. The non-transitory computer-readable recording medium according to claim 1, the operations further comprising:
automatically performing a game process with respect to the extracted object, using the extracted object as the object specified according to the operation instruction of the player.

9. The non-transitory computer-readable recording medium according to claim 8,
wherein, in the case where the predetermined object is absent, the object which is adjacent the extracted object is marked as an extracted object.

10. The non-transitory computer-readable recording medium according to claim 1,
wherein the predetermined event is a combat with an enemy character.

11. A computer apparatus, comprising:
a processor; and
a memory including a set of instructions that, when executed by the processor, causes the processor to perform operations including:
making a predetermined effect generable in a game according to a history of the game, the predetermined effect being generable until a predetermined object is specified or the game progresses to a progressing situation in which the predetermined object is specified;
generating the predetermined effect that is made generable;
specifying an object placed in a field of the game according to an operation instruction of a player;
adding the specified object to a processing target object group and performing a batch specification process, the batch specification process including:
setting one object in the processing target object group to a processing target object, and adding an object adjacent the processing target object to the processing target object group;
determining whether the predetermined object corresponding to a predetermined event is absent among new objects added to the processing target object group;
marking, in a case where the predetermined object is absent, the processing target object as an extracted object, and repeating the batch specification process for each object in the processing target object group; and
generating, in a case where the predetermined object is present, the predetermined event;
displaying results of the batch specification process on a display screen; and
changing a display mode of the specified object or a field corresponding to the specified object according to a positional relationship between a position of the specified object and a position of the predetermined object.

12. A game processing method executed in a computer apparatus, the game processing method comprising:
making a predetermined effect generable in a game according to a history of the game, the predetermined effect being generable until a predetermined object is specified or the game progresses to a progressing situation in which the predetermined object is specified;
generating the predetermined effect that is made generable;
specifying an object placed in a field of the game according to an operation instruction of a player;
adding, by a processor, the specified object to a processing target object group, and performing, by the processor, a batch specification process, the batch specification process including:
setting one object in the processing target object group to a processing target object, and adding an object adjacent the processing target object to the processing target object group;
determining whether the predetermined object corresponding to a predetermined event is absent among new objects added to the processing target object group;
marking, in a case where the predetermined object is absent, the processing target object as an extracted object, and repeating the batch specification process for each object in the processing target object group; and
generating, in a case where the predetermined object is present, the predetermined event;
displaying, on a display, results of the batch specification process on a display screen; and
changing, on the display, a display mode of the specified object or a field corresponding to the specified object according to a positional relationship between a position of the specified object and a position of the predetermined object.

13. A non-transitory computer-readable recording medium having recorded thereon a game program which is executed in a server apparatus which is connectable to a computer apparatus through communication, the game program causing the server apparatus to perform operations comprising:
  making a predetermined effect generable in a game according to a history of the game, the predetermined effect being generable until a predetermined object is specified or the game progresses to a progressing situation in which the predetermined object is specified;
  generating the predetermined effect that is made generable;
  receiving information relating to an operation instruction of a player from the computer apparatus;
  specifying an object placed in a field of the game according to the received information;
  adding the specified object to a processing target object group and performing a batch specification process, the batch specification process including:
    setting one object in the processing target object group to a processing target object, and adding an object adjacent the processing target object to the processing target object group;
    determining whether the predetermined object corresponding to a predetermined event is absent among new objects added to the processing target object group;
    marking, in a case where the predetermined object is absent, the processing target object as an extracted object, and repeating the batch specification process for each object in the processing target object group; and
    generating, in a case where the predetermined object is present, the predetermined event;
  generating results of the batch specification process for display on a display screen of the computer apparatus;
  changing a display mode of the specified object or a field corresponding to the specified object according to a positional relationship between a position of the specified object and a position of the predetermined object; and
  transmitting information relating to the results of the batch specification process and the changed display mode to the computer apparatus.

14. A system that includes a computer apparatus and a server apparatus that is connectable to the computer apparatus through communication, the system comprising:
  at least one processor; and
  at least one set of instructions that, when executed by the at least one processor, causes the at least one processor to perform operations including:
    making a predetermined effect generable in a game according to a history of the game, the predetermined effect being generable until a predetermined object is specified or the game progresses to a progressing situation in which the predetermined object is specified;
    generating the predetermined effect that is made generable;
    specifying an object placed in a field of the game according to an operation instruction of a player;
    adding the specified object to a processing target object group and performing a batch specification process, the batch specification process including:
      setting one object in the processing target object group to a processing target object, and adding an object adjacent the processing target object to the processing target object group;
      determining whether the predetermined object corresponding to a predetermined event is absent among new objects added to the processing target object group;
      marking, in a case where the predetermined object is absent, the processing target object as an extracted object, and repeating the batch specification process for each object in the processing target object group; and
      generating, in a case where the predetermined object is present, the predetermined event;
    displaying results of the batch specification process on a display screen; and
    changing a display mode of the specified object or a field corresponding to the specified object according to a positional relationship between a position of the specified object and a position of the predetermined object.

15. A non-transitory computer-readable recording medium having recorded thereon a game program which is executed in a computer apparatus that is connectable to a server apparatus through communication,
  wherein the server apparatus:
    makes a predetermined effect generable in a game according to a history of the game, the predetermined effect being generable until a predetermined object is specified or the game progresses to a progressing situation in which the predetermined object is specified;
    generates the predetermined effect that is made generable;
    receives information relating to an operation instruction of a player from the computer apparatus;
    specifies an object placed in a field of the game according to the received information;
    adds the specified object to a processing target object group and performs a batch specification process, the batch specification process:
      sets one object in the processing target object group to a processing target object, and adds an object adjacent the processing target object to the processing target object group;
      determines whether the predetermined object corresponding to a predetermined event is absent among new objects added to the processing target object group;
      marks, in a case where the predetermined object is absent, the processing target object as an extracted object, and repeats the batch specification process for each object in the processing target object group; and
      generates, in a case where the predetermined object is present, the predetermined event;
    generates results of the batch specification process for display on a display screen of the computer apparatus;
    changes a display mode of the specified object or a field corresponding to the specified object according to a positional relationship between a position of the specified object and a position of the predetermined object; and
    transmits information relating to the results of the batch specification process and the changed display mode to the computer apparatus, and wherein the game program causes the computer apparatus to perform operations comprising:
transmitting the information relating to the operation instruction of the player to the server apparatus,
receiving the information relating to the results of the batch specification process and the changed display mode from the server apparatus, and
displays the received information relating to the results of the batch specification process and the changed display mode on the display screen.

16. A game processing method executed in a server apparatus that is connectable to a computer apparatus through communication, the game processing method comprising:
making a predetermined effect generable in a game according to a history of the game, the predetermined effect being generable until a predetermined object is specified or the game progresses to a progressing situation in which the predetermined object is specified;
generating the predetermined effect that is made generable;
receiving, by a communication interface, information relating to an operation instruction of a player from the computer apparatus;
specifying an object placed in a field of the game according to the received information;
adding, by a processor, the specified object to a processing target object group and performing, by the processor, a batch specification process, the batch specification process including:
setting one object in the processing target object group to a processing target object, and adding an object adjacent the processing target object to the processing target object group;
determining whether the predetermined object corresponding to a predetermined event is absent among new objects added to the processing target object group;
marking, in a case where the predetermined object is absent, the processing target object as an extracted object, and repeating the batch specification process for each object in the processing target object group; and
generating, in a case where the predetermined object is present, the predetermined event;
generating results of the batch specification process for display on a display screen of the computer apparatus;
changing a display mode of the specified object or a field corresponding to the specified object according to a positional relationship between a position of the specified object and a position of the predetermined object; and
transmitting, by the communication interface, information relating to the results of the batch specification process and the changed display mode to the computer apparatus.

17. A game processing method executed in a system that includes a computer apparatus and a server apparatus that is connectable to the computer apparatus through communication, the game processing method comprising:
making a predetermined effect generable in a game according to a history of the game, the predetermined effect being generable until a predetermined object is specified or the game progresses to a progressing situation in which the predetermined object is specified;
generating the predetermined effect that is made generable;
specifying an object placed in a field of the game according to an operation instruction of a player;
adding, by a processor, the specified object to a processing target object group and performing, by the processor, a batch specification process, the batch specification process including:
setting one object in the processing target object group to a processing target object, and adding an object adjacent the processing target object to the processing target object group;
determining whether the predetermined object corresponding to a predetermined event is absent among new objects added to the processing target object group;
marking, in a case where the predetermined object is absent, the processing target object as an extracted object, and repeating the batch specification process for each object in the processing target object group; and
generating, in a case where the predetermined object is present, the predetermined event;
displaying, on a display screen, results of the batch specification process; and
changing, on the display screen, a display mode of the specified object or a field corresponding to the specified object according to a positional relationship between a position of the specified object and a position of the predetermined object for display.

* * * * *